United States Patent [19]

Prester

[11] 4,096,551
[45] Jun. 20, 1978

[54] LAMP MOUNTING SYSTEM

[75] Inventor: Lorrain Wilbert Prester, Dorchester, Nebr.

[73] Assignee: Plexi-Lite Mfg., Inc., Lincoln, Nebr.

[21] Appl. No.: 721,963

[22] Filed: Sep. 10, 1976

[51] Int. Cl.² ............................................... B60Q 1/32
[52] U.S. Cl. ......................................... 362/83; 362/72
[58] Field of Search .................... 240/1 EL, 22, 46.59, 240/2 R, 26, 52.1, 52.15; 340/321, 107, 87, 84; 40/130 K, 131 R

[56] References Cited

U.S. PATENT DOCUMENTS

| | | | |
|---|---|---|---|
| 2,875,324 | 2/1959 | Camp et al. | 240/52.15 |
| 3,274,548 | 9/1966 | Brimsek | 340/84 |
| 3,435,412 | 3/1969 | Bohrer, Sr. | 340/107 |
| 3,566,100 | 8/1968 | Seeley et al. | 240/26 |
| 3,890,497 | 6/1975 | Rush | 240/7.55 |
| 3,947,677 | 3/1976 | Steinle | 240/8.1 R |

OTHER PUBLICATIONS

"Packaging of Miniature Lens-End Lamps," IBM Technical Disclosure Bulletin, Oct. 1964, p. 399.

Primary Examiner—J D Miller
Assistant Examiner—Peter S. Wong
Attorney, Agent, or Firm—Vincent L. Carney

[57] ABSTRACT

To permit convenient attachment of a warning lighting system to the stop sign of a school bus, U or channel-shaped brackets for warning lamps are hinged to each other at adjacent sides so that the lighting system may be positioned around the edge of the stop sign to mount lamps housed in solid translucent plastic thereto. Because the lamps are encased in relatively thick plastic, they project from the channel shaped bracket and nonetheless withstand the shock of the stop sign banging against the bus or vibrating with the motion of the bus. The lamp may be constructed to serve other purposes which require the solid plastic encasing for sturdiness and waterproofing, such as: (1) mounting on the top of the pole of a bike with pin inserts; (2) magnetic mounting to the body of a car; or (3) to be immersed in water for fishing.

6 Claims, 8 Drawing Figures

LAMP MOUNTING SYSTEM

This invention relates to mounting systems for lighting systems.

One class of lighting system includes one or more lamp bulbs each within a translucent plastic housing, which may be clear or tinted. Such lamps may be mounted in exposed positions because of their ability to withstand inclement weather and shock. In one type of prior art lighting system of this class, the lamps are individually mounted to warning signs or the like by fixed fasteners such as screws or the like. Although these lamps are satisfactory and in many respects, superior to other types of lamps for such conditions because of their sturdiness and ability to withstand shock, it is desirable to provide a more economical mounting for such lamps.

Accordingly, it is an object of the invention to provide a novel lamp mounting assembly.

It is a further object of the invention to provide an illumination system for bus stop signs.

It is a still further object of the invention to provide a novel mounting arrangement for lamps that are to withstand shock.

It is a still further object of the invention to provide a mounting arrangement for lamps which must be immersed in water or exposed to moisture.

In accordance with the above and further objects of the invention, a lamp assembly includes a bracket formed of the plurality of U-shaped members hinged together at one or more locations and including a plurality of straight segments at an angle to each other about a center facing the open sides of the U. The sides of the U-shaped channels are sufficiently far apart to fit over the edge of a stop sign.

Lamps are mounted on selected ones of the tops of the U-shaped members with conductive leads extending from the lamps through the top of the bracket and passing along the U-shaped members from lamp to lamp within the U. At the end of the last segment the conductors extend outside the U-shaped member for connection to a source of power. Outside the bracket, the conductors pass along a support arm to a flasher and battery or only to a battery to which they are electrically connected.

The lamps include a solid plastic housing in which a lamp bulb is positioned with the opposite ends of the bulb filament being connected to the conductors that extend into the U-shaped portions of the bracket.

With this configuration, a waterproof, wear-and-shock resistant lighting assembly is formed for easy attachment about the stop signs commonly found on school buses. The assembly can be positioned easily on the stop sign and fastened in place and is able to withstand the vibrations of the truck, exposure to the elements and the rough handling caused by the extension and retraction of the stop sign. Of course, it may be used on other types of signs.

The lamps are specially built to be waterproof and sturdy and may be mounted to configurations other than brackets for stop signs. In one embodiment, the lamp is mounted to the top of the warning pole on bicycles and includes for this purpose two pins that depend from the plastic housing and may be inserted into the pole to provide an electrical connection to opposite ends of the filament of the lamp and to mechanically connect the lamp to the pole. The pins make connection with a battery and, in some embodiments, a flasher to provide a warning light for bicyclists at night.

In still another embodiment, conductors of the twisted pair type are electrically connected to the filaments of the bulb within the plastic housing and mechanically connected to the housing to permit the lamp to be used at a long distance from the source of power. It can be lowered by the twisted pair, for example, under water for fishing where this is lawful or can be mounted by means of a magnet to a metallic body such as the underside of a car for use by a mechanic.

From the above description, it can be understood that the lamp assemblies of this invention have the advantages of: (1) being economical; (2) being easily installed; (3) being weather resistant and resistant to water so that they can be immersed in a body of water if necessary; and (4) being shock and wear resistant.

The above and noted other features of the invention will be better understood from the following detailed description when considered with reference to the accompanying drawings in which.

Figure 1:
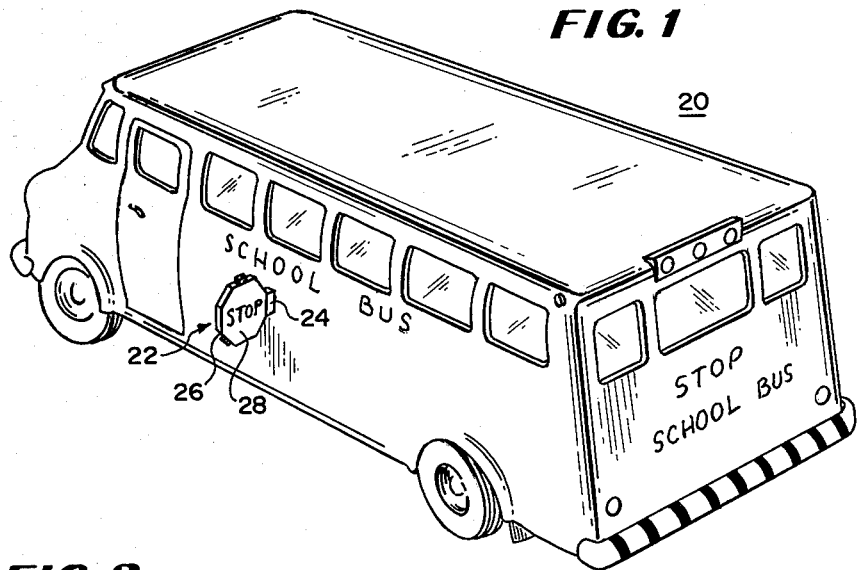
FIG. 1 is a simplified perspective view of a school bus including a lamp assembly in accordance with the invention.

In FIG. 1, there is shown a perspective view of a school bus 20 having mounted to it an extendable stop sign 22 which is activated to move outwardly from the side of the bus 20 on a support 24 in a manner known in the art to warn other motorists to stop while the bus is loading and unloading in accordance with the local traffic laws. The stop sign 22 includes a central sign portion 28 and a lighting system 26 along its outer periphery including a plurality of lights that are energized to attract the attention of motorists.

Figure 2:
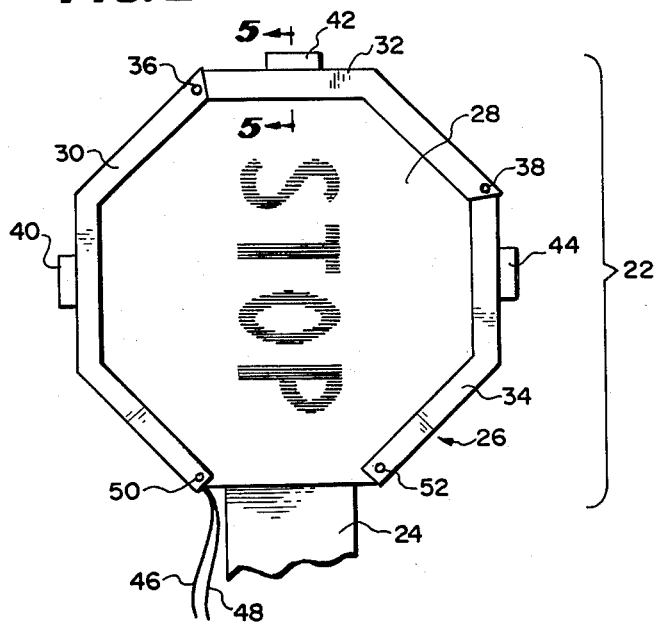
FIG. 2 is a fragmentary elevational view of a portion of the lamp assembly in FIG. 1.

As best shown in FIG. 2, the central portion of the stop sign 22 is a flat, sheet metal plate 28 of traditional octagonal shape with the letters "STOP" printed upon it and the lighting system 26 is affixed to its outer periphery. The lighting system 26 includes three sections 30, 32, and 34 hinged to each other by two pivot pins 36 and 38, the pin 36 pivotally connecting sections 30 and 32 and the pin 38 pivotally connecting sections 32 and 34.

To mount lamps to the center sign portion 28 of the stop sign 22, the sections 30, 32 and 34 cover seven of the edges of the center portion 28, with: (1) the section 30 overlying three of the edges of the metal plate 28 and including three adjacent portions at angles to each other to conform to three adjacent edges of the plate 28, the center portion having a lamp 40 mounted to it; (2) the section 32 overlying two adjacent edges of the metal plate 28 and having two portions at angles to each other, the portion adjacent to the section 30 having a lamp 42 mounted to it; and (3) the section 34 having two adjacent portions at an angle to each other, each overlying a different adjacent edge of the octagonal plate 28 and having mounted to it a lamp 44 centered on the portion adjacent to the section 32.

The lamps 40, 42 and 44 are identical and are each centered on a different portion of the sections 30, 32 and 34. First and second electrical conductors 46 and 48 are within the sections 30, 32 and 34 and electrically connect the lamps 40, 42 and 44 in parallel to a source of electrical power (not shown in FIG. 2). The edge of the octagonal plate 28 which overlies the support 24 is not covered by any portion of the bracket and adjacent thereto on the bracket are two tapped holes, 50 and 52, with 50 being on section 30 and 52 on section 34, each of which receives a set screw for firmly fastening the bracket in place on the octagonal plate 28.

The lighting system 26 is easily attached to the stop sign since the sections 30, 32 and 34 are easily positioned over the edge and fastened firmly by set screws in tapped holes 50 and 52 with the conductors 46 and 48 extending from them for electrical connections. The lamps 40, 42 and 44 are of the waterproof shockproof type disclosed in U.S. Pat. No. 3,947,677 to Leo D. Steinle so as to withstand shock and short circuits from moisture during use.

In operation, the lamps 40, 42 and 44 are electrically connected in parallel and are energized through the conductors 46 and 48 to emit light when the sign 22 is extended from the school bus.

Although three lamps are shown within the lighting assembly 26, a larger or fewer number may be used. Similarly, although a three-section mounting bracket is shown, a larger or fewer number of sections may be included by changing the pivot points. For example, each of the seven edges may be covered by a different straight section pivoted to the adjacent section by a different pivot pin or four sides could be covered by one continuous section and three by the other with one pivot point between them. Three sections were selected for maximum ease in assembly. It is only necessary that each section conforms substantially to the edge it must cover and the distance between the end points of the section be sufficiently long to fit over the area it must encompass which means it must be longer than any parallel line within the section.

In the preferred embodiment the lamps 40, 42 and 44 are energized by a source of DC potential from a battery but other sources of potential, including AC potential, can be used with the appropriate lamps. With a DC source and a metallic support arm 24, only one conductor is necessary, since the lamps can be grounded to the bracket of the lamp assembly or to the plate 28 and thus be grounded through the support 24 to the metal frame of the bus. However, where good electrical connections are not available through the support 24, in a DC system, one of the conductors 48 applies a positive potential to the lamps and the other is grounded to the frame of the bus or to the source of electrical power.

Figure 3:
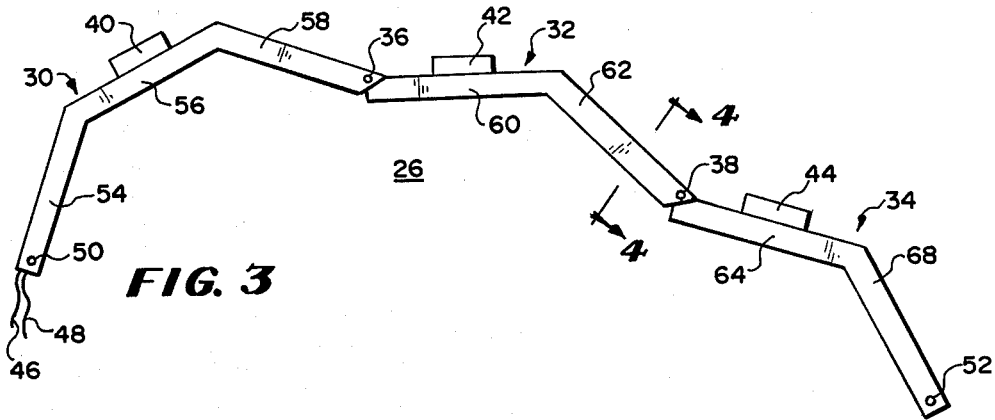
FIG. 3 is an elevational view of a portion of the lamp assembly of FIG. 1.

In FIG. 3, there is shown the lighting assembly 26 separated from the stop sign 22 and opened. As shown in this figure, the sections 30, 32 and 34 pivot about the pins 36 and 38 respectively to permit the opening of the lamp assembly and its closing around the octagonal plate 28. The section 30 includes three portions 54, 56 and 58, with the portions 54 and 58 extending from opposite ends of the portion 56 at 135° thereto to conform to two sides of the octagon plate 28. The portion 54 has at its distal end a tapped hole 50 for the set screw and the conductors 46 and 48 extend therefrom. Centered at the top of the portion 56 is the lamp 40 which is secured thereto by screws, although other suitable methods of securing it may be used. The pivot pin 36 connects the portion 58 to the section 32.

The section 32 includes two portions 60 and 62 each at 135° to the other, with the portion 60 at one end having apertures to accommodate the pivot pin 36 which connects it to the portion 58 of the section 30 and the portion 62 having apertures to accommodate the pivot pin 38 which pivotally connects it to the section 34. Similarly, the section 34 includes two portions 64 and 68 formed at 135° with respect to each other. The portion 60 in the section 32 has centered upon it the lamp 42 and the section 64 has centered upon it the lamp 44. Each of the portions 54-68 have the same length and conform in length at their lower surface to the length of the edges of the stop sign 22 about which they are to be positioned.

Figure 4:
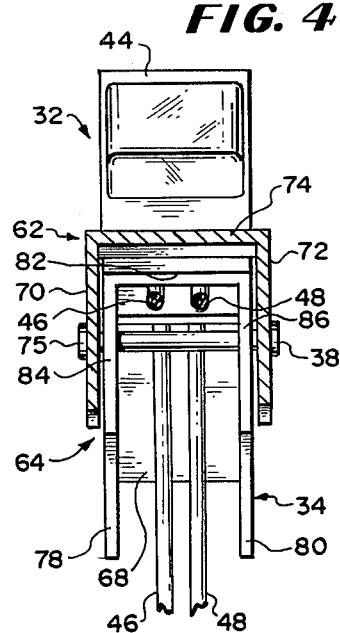
FIG. 4 is a sectional view taken through lines 4—4 of FIG. 3.

In FIG. 4, there is shown in a sectional view part of the portion 62 and unsectioned portions 64 and 68. As shown in this figure the portion 62 is a sheet metal inverted U-shaped metal stamping having sides 70 and 72 and a top 74. Within the inverted U formed by the sides 70 and 72 and the top 74, are the conductors 46 and 48 and a spacer 75 which may be fastened by any suitable means such as by adhesive, welding or the like to hold the conductors in place and to form a bottom support against which the edge of the octagonal plate 28 (FIG. 2) fits.

Each of the portions 54-68 is formed from a metal stamping in the same manner. Section 34 includes side portions 78 and 80 and a top portion 82, with side portions 70 and 78 and the side portions 72 and 80 being pinned together by the pin 38 at 84 and 86 where the side walls are bent to overlap each other and form a pivotal connection.

The pin 38 is positioned sufficiently close to the top walls 74 and 82 so as to be substantially level with the spacers 75 thus permitting proper seating of the bracket over the edge of the stop sign 28 and aiding in the holding of the conductors 46 and 48. The spacers 75 may be intermittently spaced or substantially solidly spaced along the sections 30, 32 and 34. The main criteria is that they hold conductors 46 and 48 in place and form a bottoming surface for the edge of the octagonal plate 28 (FIG 2). The sections at 84 and 86 are bent sufficiently to provide clearance where the portions of different sections overlap.

Figure 5:
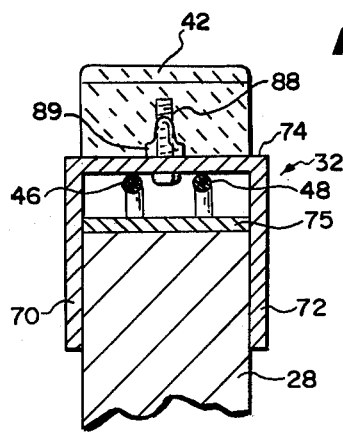
FIG. 5 is a fragmentary sectional view taken through lines 5—5 of FIG. 2.

In FIG. 5, there is shown, in section, the lamp 42 mounted to the section 32 of the lighting system in place over the octagonal plate 28. The lamp 42 is held in place by means of two screws, one of which is shown at 88 on one side of the lamp 42 threaded from the bottom side of the top surface 74, through the surface into the lamp 42.

To energize the lamp 42, a bulb 89 therein is electrically connected to the conductors 46 and 48 connected through the base of the lamp 42 and through apertures in the top plate 74. To receive the conductors 46 and 48, the sides 70 and 72 of the section 32 fit over the octagonal plate 28 with a close fit and the plate abuts against the spacer 75 leaving a clearance for the electrical connection and the heads of the screw holding the lamp 42 onto the section 32 of the bracket.

Figure 6:
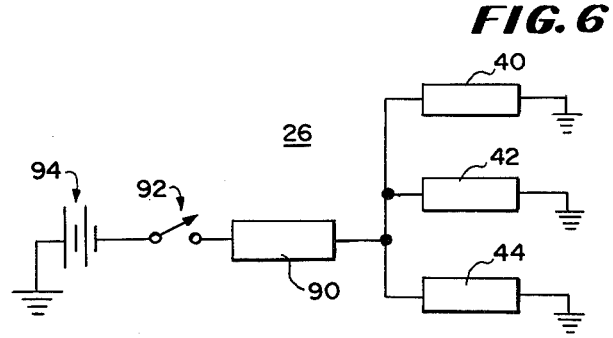
FIG. 6 is a simplified schematic view of a portion of the lamp assembly of FIG. 1.

In FIG. 6, there is shown a schematic circuit diagram of the lighting system 26, having the three lamps 40-44, a flasher 90, a single pole single throw switch 92, and a battery 94. The battery 94 may be the bus battery, in which case the ignition switch (not shown) is connected between the battery 94 and the single pole single throw switch 92. The switch 92 is normally mounted at a convenient location on the dashboard of the bus.

The flasher 90 is a conventional emergency flasher which normally flashes the emergency lights of a vehicle. The negative terminal of battery 94 is grounded to the vehicle body and the positive terminal, the single pole single throw switch 92, the flasher 90 are connected in series in the order named, with the output from the flasher 90 being connected to each of the lamps 40, 42, and 44 in parallel, and the other terminal of the lamps being each grounded.

To assemble the lighting system 26, to an octagonal plate such as 28, the portion 60 (FIG. 3) is put on the top edge with the sides 70 and 72 (FIGS. 4 and 5) extending downwardly over the sides and the portion 74 fitting over the edge. The sections 30 and 34 are then pivoted about pins 36 and 38 (FIG. 2) so that the section 30 and 34 conform to five edges, leaving the edge adjacent to support arm 24 free.

To fasten the lighting system 26 securely in place, set screws 50 and 52 are threaded into place, with the electric conductors 46 and 48 extending from the lighting system 26 and along the support arm 24. The conductors 46 and 48 are fastened to the support arm 24 and connected to the electrical system shown in FIG. 6. In embodiments having a metal arm 24 and a metal octagonal plate 28, one end of the filaments of each of the lamps 40, 42 and 44 may be grounded directly to the octagonal plate 28.

In use, the driver of the bus closes the switch 92 when causing the arm 24 to be extended so that the stop sign is visible, energizing the flasher 90 to pulse the lamps 40, 42 and 44 under the power of the battery 94 of the bus 20. Accordingly, the lamps about the stop sign flash thus attracting the attention of motorists.

Figure 7:
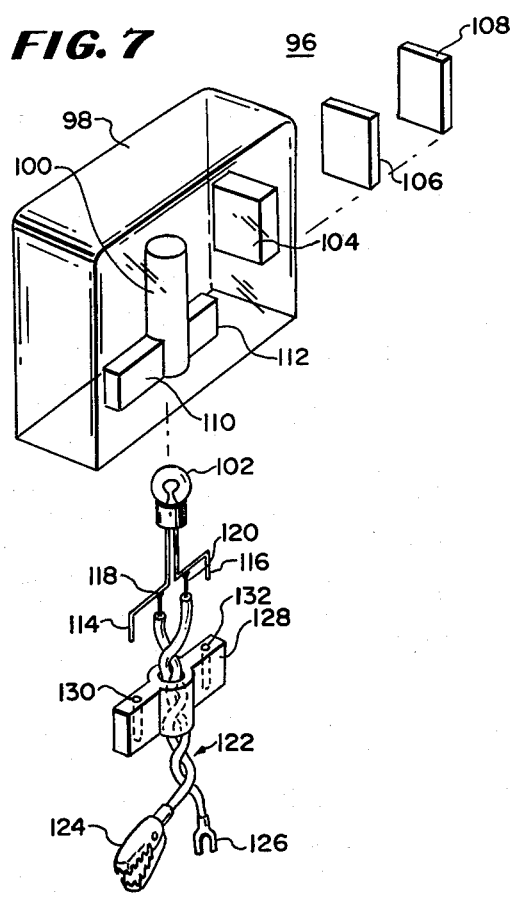
FIG. 7 is a simplified exploded perspective view of an embodiment of a lamp in accordance with the invention.

In FIG. 7, there is shown an exploded perspective view of a lamp 96 including a housing 98, a lamp recess 100, a lamp 102, a magnet recess 104 and a magnet 106 as its principal parts.

The housing 98 is generally in the shape of a right regular parallelepiped having four narrow faces forming a base, a top, a side, and two vertical edges and two relatively large flat radiating sides. The housing is substantially solid and formed of a clear plastic material such as Lucite or the like to permit light to be radiated therefrom with the cylindrical recess 100 extending upwardly from its bottom surface to receive the lamp 102.

One of the vertical edges includes the recess 104 into which fits the complementarily shaped ceramic magnet 106. The magnet 106 is held in place by a plastic Lucite insert 108 that fits over it also of Lucite or the like. The magnet 106, the recess 104, and the plastic insert 108 are of such a size that the magnet 106 fits tightly in the magnet recess 104 but is sufficiently recessed from the edge of the housing 98 to receive the Lucite plug 108. The plug 108 is sealed by heat or adhesive or the like.

The lamp bulb 102 fits within the cylindrical recess 100 with its socket being fully encompassed and leads extending downwardly. To provide electrical connections to the lamp bulb 102 two rectangular recesses 110 and 112 interconnect with the cylindrical recess 100 and receive outwardly extending conductors 114 and 116 connected to opposite sides of the filament of the bulb 102. Additional bare conductor 118 is connected to 114 and conductor 120 is electrically connected to 116, which conductors are insulated prior to their exit from the housing 98 and which form the twisted pair 122. One end of the twisted pair ends in the alligator clip 124 and the other in the spade clip 126 to form terminals for connection to positive and negative terminals of a battery respectively. A stop member 128 includes two apertures 130 and 132 and is shaped to fit within the recesses 100, 110, and 112.

With the bulb 102 properly positioned within the cylindrical recess 100 and the conductors 114 and 116 properly positioned, the outlet opening of the housing is sealed by the plug 128. This plug includes the two apertures 130 and 132 in one embodiment to receive the prongs connected to a battery source to which the light is mounted. In another embodiment the apertures 130 and 132 are closed but the twisted pair 122 extends downwardly so that the lamp 96 may be immersed in water, where it is protected from the water by the Lucite housing which is completely sealed and by the insulation on the twisted pair 122. In still another embodiment, with the magnet 106 in place, the spade and alligator clips 126 and 124 are connected to a source of power and the lamp mounted by the magnet to metal such as the body of an automobile while the lamp is being used.

With this construction, the same basic lamp may be mounted to different embodiments with slight modifications such as filling in the apertures 130 and 132 of the stop 128 and connecting the twisted pair 122 or in the alternative, clipping the twisted pair 122 off at the base and sealing the openings while keeping the apertures 130 and 132 open to receive the prongs from a battery source. The magnet 106 may be included or may be omitted depending on whether or not the lamp is to be attached magnetically to a surface and powered through the twisted pair 122. In all embodiments, the largest amount of light flux is emitted from the wide flat surfaces rather than the edge so that the opaque magnet 106 does not seriously impede the use of the lamp.

Figure 8:
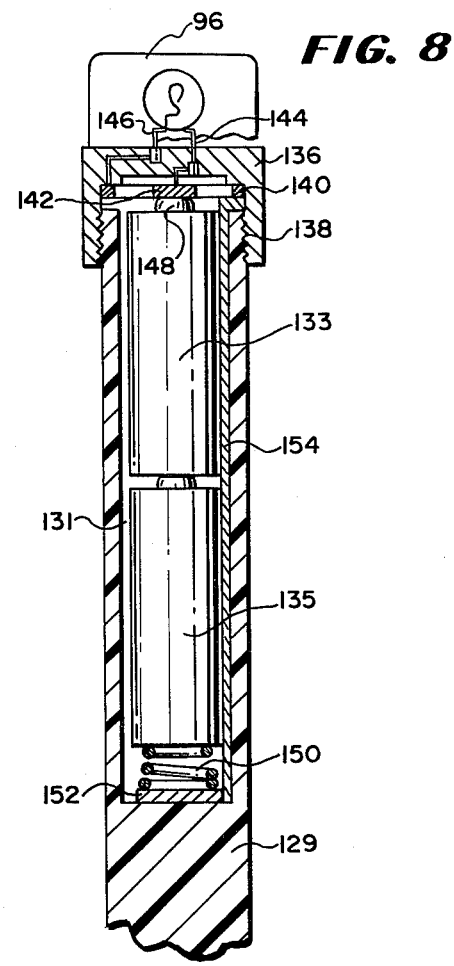
FIG. 8 is a longitudinal sectional view, partly simplified, of another embodiment of the invention.

In FIG. 8, there is shown an embodiment of a lamp mount for receiving the lamp 96 which mount utilizes the prong insert rather than the twisted pair electrical connection 122. In this embodiment, a warning pole 129 of the type mounted to bicycles and normally carrying a flag receives the lamp 96. This mounting pole is recessed at 131 to receive penlight batteries 133 and 135 which power the lamp 96 mounted to its top to provide a warning light. A flasher may be optionally included (not shown in FIG. 8) to provide a flashing light rather than a steady light.

To mount the lamp 96 to the pole 129, the mounting 129 includes a cap 136 having internal threads which match external threads on the tubular pole 129 at 138 to permit the cap to be screwed over the recess containing the batteries 133 and 135. The cap 136 includes a metallic ring 140 and a metallic plate 142, with the metallic ring 140 being electrically connected to a first prong 144 and the plate 142 being connected to a metallic prong 146. The plate 142 is positioned to contract the positive terminal 148 of one of the penlight batteries to provide a source of positive potential to one of the conductors of the lamp 96 when the lamp is mounted on the prongs 144 and 146. The prong 144 provides a negative or ground connection.

To provide a negative or ground connection to the circuit, the pole 129 includes a spring 150 at the bottom of the recess 131 positioned between the penlight battery 135 and a metallic plate 152. The metallic plate 152 is connected by a metallic conductor 154 which runs along the side of the recess 131 to the ring 140 and the cap 136 when the cap is threaded tightly down on the pole 129. In the preferred embodiment the prongs 144 and 146 are permenently mounted to the cap 136 but they may, instead, by permenently mounted to the lamp 96.

With these connections, the lamp 96 is illuminated by tightening the cap 136 downward on the pole. In the alternative, the pole may include a switch (not shown) in series with portions of the conductor 154 to break the electrical circuit including the lamp 96 when the switch is in one position and to complete it when it is in the other position.

As can be understood from the above description, the mountings of the lamp systems in accordance with this invention have several advantages such as: (1) they are rugged and resistant to vibration and wear; (2) they are relatively inexpensive; (3) they are weather resistant; and (4) they are easily assembled for use.

Although preferred embodiments have been disclosed with some particularity, many modifications and variations in the preferred embodiment are possible within the light of the above teachings without deviating from the invention. Accordingly, it is to be understood that, within the scope of the appended claims, the invention may be practiced other than as specifically described.

What is claimed is:

1. A lighting assembly comprising:
   seven straight sections;
   each of said sections being substantially U-shaped and having two legs and a connecting member;
   certain of said seven sections being integrally formed with other of said seven sections and forming a 135° angle therewith;
   at least two of said seven sections being hinged together, whereby said seven sections may be formed into a figure encompassing seven sides of an octagon or opened a distance greater than any diameter of the aforesaid octagon;
   at least one lamp mounted to the connecting member of at least one of said sections so as to extend therefrom;
   said lamp being electrically connected to conductors mounted within the legs of said U-shaped members of said seven sections;
   said lamp including an incandescent lamp member and a clear plastic housing;
   said incandescent lamp member being embedded in said clear plastic housing, whereby said assembly is shock resistant.

2. A lighting assembly according to claim 1 further comprising:
   an octagonal plate having the lettering STOP on at least one surface;
   said legs of said U-shaped members being spaced apart from each other a distance equal to the width of the edge of said plate;
   said plate being positioned between the legs of said sections, with said sections fitting around said octagonal plate except for one side.

3. A lighting assembly according to claim 2 in which three of said lamps are mounted to the connecting member of three alternate ones of said seven sections.

4. A lighting assembly according to claim 3 further including a flasher electrically connected to at least one of said conductors.

5. A lighting assembly according to claim 4 comprising at least a battery having one terminal electrically connected to said flasher and the other terminal grounded.

6. A lighting assembly according to claim 5 further comprising:
   an extendable arm fastened to said plate;
   said extendable arm being adapted to be retracted and extended from the side of a school bus.

* * * * *